March 11, 1969  H. BEYERSDORF ET AL  3,432,706
ROTARY ELECTRIC MACHINE
Filed Jan. 24, 1967

Inventors:
Hartwig Beyersdorf
Gerhard Bering
BY Spencer & Kaye
Attorneys

United States Patent Office 3,432,706
Patented Mar. 11, 1969

3,432,706
ROTARY ELECTRIC MACHINE
Hartwig Beyersdorf, Bremen-Arbergen, and Gerhard Bering, Bremen, Germany, assignors to Lloyd Dynamowerke G.m.b.H., Bremen, Germany
Filed Jan. 24, 1967, Ser. No. 611,273
Claims priority, application Germany, Jan. 26, 1966, L 52,690
U.S. Cl. 310—157
Int. Cl. H02k 1/22
10 Claims

ABSTRACT OF THE DISCLOSURE

A rotary electric generator or motor having a rotary disc portion disposed between two stator disc portions and provided with a plurality of circumferentially-spaced, radially-extending spokes which are made of a magnetizable material and which define, in the space between the stator disc portions, zones of high magnetic conductivity in an axial direction separated by air spaces defining zones of low magnetic conductivity in an axial direction, at least one of the stator disc portions being provided with an annular excitation winding and an A.C. winding having radially-extending conductor portions.

Background of the invention

The present invention relates to rotary electric machines, and particularly to machines of the type having rotor and stator portions in the form of discs spaced from one another along the axis of rotation of the machine.

It has already been suggested to construct a rotary electric machine of a plurality of disc portions disposed parallel to one another and spaced from one another along the axis of rotation of the machine shaft. At least one of these disc portions is mounted in a stationary manner to constitute a stator and at least one other disc portion is mounted to rotate with the machine shaft and to constitute a rotor.

The operation of these devices either as motors or generators requires the provision of a D.C. excitation winding and an A.C. winding. One of the stator disc portions is also constructed to have alternating zones of high and low magnetic conductivity which is measured in an axial direction, each of these zones generally extending in a radial direction perpendicular to the flow of excitation flux, the zones being distributed around the circumference of the disc portion. These zones have the effect of producing a magnetic conductivity, and hence a flux density, which varies in a cyclical manner about the machine axis.

It has already been suggested to produce these zones by forming radially-extending slots and teeth in at least one lateral end face of one of the disc portions. When such a form of construction is employed, the zones of low magnetic conductivity, with respect to axially extending flux paths, still include a certain amount of magnetizable material.

Similar electric machines having other forms of construction are also provided with zones of variable conductivity constituted by slots and teeth. The construction of the members having such slots and teeth is relatively complicated and the construction of each individual member requires a long period of time. This constitutes a serious handicap to the economical construction of such machines, and particularly to their mass production, since the individual elements of such a member cannot be prefabricated and assembled by assembly line techniques.

It has also already been suggested to provide an electrical machine having a rotating part which does not carry any winding and which is given a star-shaped configuration. Such a part produces the required flux density variations by presenting flux paths of varying magnetic conductivity. The arms of the star-shaped part are made of magnetizable material and produce flux paths of high magnetic conductivity, whereas the spaces between these arms create flux paths of low magnetic conductivity. However, star-shaped members of this type when used in known machines do not make efficient use of the magnetizable material which they contain since they define flux paths of great length. It has been found that, as a result, such devices make less efficient use of the existing flux than do the usual machines of cylindrical construction.

Furthermore, the latter-described type of construction is also disadvantageous because the inductances created by the different zones will be varied considerably by any small deviations in the air gap length. Because the magnetic conductivity of these paths varies in a quadratic manner with respect to the air gap length, the result will be an intensification of the unbalance forces arising from such length deviations. This might tend to give rise to unilateral axial forces which must be absorbed by the machine bearings. In addition, these forces will tend to induce deflections and oscillations in the arms of the star-shaped part. It has also been found that a maximum output cannot be achieved in a machine having such a star-shaped part.

Summary of the invention

It is therefore a primary object of the present invention to reduce these drawbacks and difficulties.

A further object of the present invention is to improve the efficiency of rotary electric machines having a disc construction.

A further object of the present invention is to reduce the weight of the rotary member or members of such machines.

Yet another object of the present invention is to provide an increased magnetic conductivity variation between adjacent zones of machines of this type.

These and other objects according to the present invention are achieved, in a rotary electric machine of disc construction, by a novel construction of at least one disc portion which is axially spaced from two other disc portions to define at least two air gaps each extending between a respective adjacent pair of these disc portions. At least one of these disc portions is stationary and constitutes a machine stator and at least another one of the disc portions is rotatable and constitutes a machine rotor. The machine further includes at least one annular homopolar excitation winding carried by one of the disc portions for producing a D.C. excitation field passing axially through at least the rotor, and at least one A.C. winding carried by one of the disc portions. The improvement according to the present invention consists primarily in that the rotor is constructed of a plurality of radially-extending spokes of magnetizable material spaced apart about the axis of rotation of the machine, the spokes themselves defining regions of high magnetic conductivity to flux flowing axially through the rotor and the spaces between the spokes defining regions of low magnetic conductivity to such flux. The rotor according to the present invention further includes nonmagnetic spacer means dividing each of the spokes into an inner portion and an outer portion along a circle aligned with the homopolar excitation winding. In a rotor constructed in this manner, flux produced by the homopolar winding flows in one axial direction through the region occupied by the inner spoke portions and in the opposite axial direction through the region occupied by the outer spoke portions.

Description of the preferred embodiments

Figure 1:
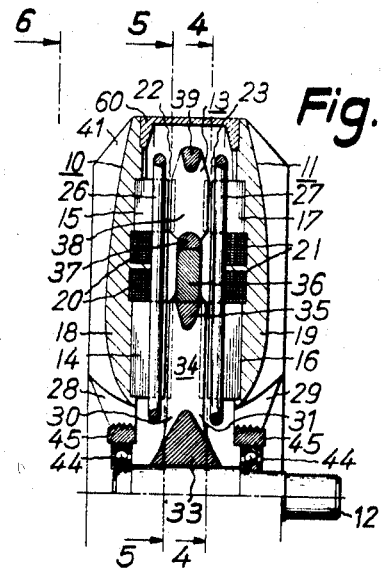
FIGURE 1 is a longitudinal cross-sectional view of the upper half of a machine constituting one embodiment of the present invention.
Figure 2:
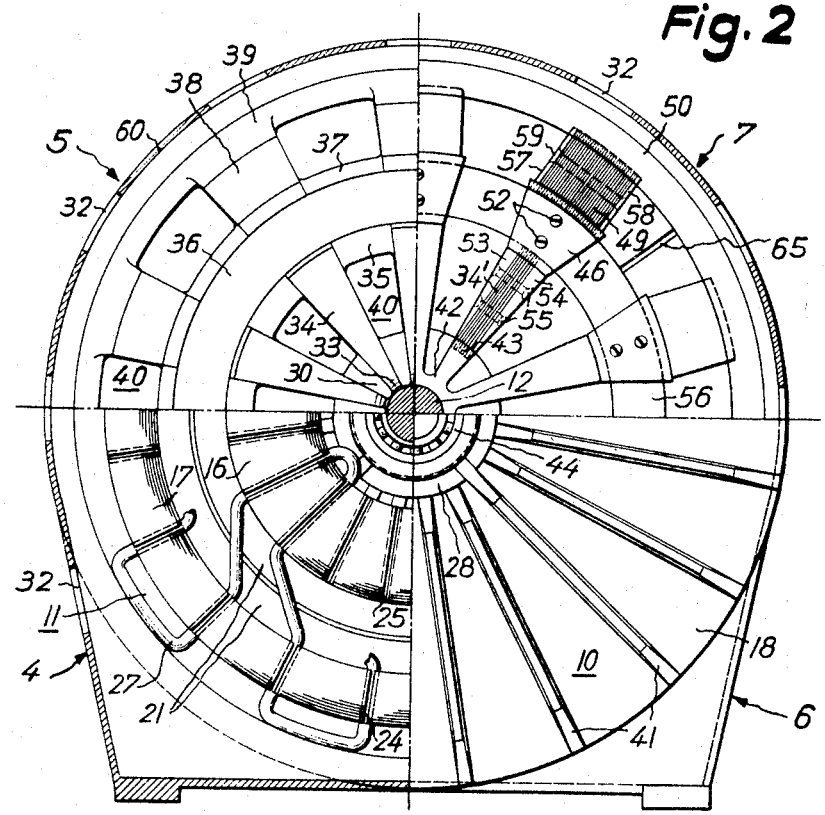
FIGURE 2 is a composite axial view divided into four quadrants: quadrant 4 is a cross-sectional view taken along the line 4—4 of FIGURE 1; quadrant 5 is a cross-sectional view taken along line 5—5 of FIGURE 1; quadrant 6 is an elevational view taken in the direction of the arrow 6 of FIGURE 1; and quadrant 7 is an elevational view taken in the direction of the arrow 7 of FIGURE 3.

Referring first to FIGURE 1 and quadrants 4, 5 and 6 of FIGURE 2, there is shown a rotary electric machine constituting one embodiment of the present invention and including two stationary disc portions 10 and 11 and a rotary central disc portion 13 disposed between portions 10 and 11 and mounted for rotation with the machine shaft 12.

The stationary disc portion 10 is composed essentially of an inner laminated core element 14 and an outer laminated core element 15, both elements being disposed concentrically with respect to the axis of shaft 12. Each of the core elements may be composed either of a single spirally wound metal strip each turn of which constitutes one lamination layer, or of a plurality of concentric thin metal bands. The portion 10 further includes a solid annular body 18 disposed to the outside of the machine and supporting the elements 14 and 15.

Similarly, this portion 11 is composed of an inner core element 16, an outer core element 17, and a solid annular body 19, each of these elements being structurally identical to a corresponding one of the elements 14, 15 and 18.

Disposed between core elements 14 and 15 of disc portion 10 is a two-part annular homopolar excitation winding 20. An identical annular excitation winding 21 is disposed between the core elements 16 and 17 of disc portion 11. The two parts of each excitation winding are disposed in the same plane perpendicular to the axis of rotation of shaft 12 and are both arranged concentrically with respect to that axis. The excitation windings 20 and 21 produce a homopolar magnetic flux field the flux lines of which extend in one axial direction between core elements 14 and 16 and in the opposite axial direction between core elements 15 and 17. The return paths for these flux lines are provided by the solid annular bodies 18 and 19 whose external lateral surfaces are curved to conform generally to the paths followed by the flux through these bodies so that these bodies include a minimum of non-essential metal.

The inner radially-extending end faces of core elements 14 and 15 are separated from one radially-extending end face of rotary disc portion 13 by an air gap 22, while the corresponding end faces of core elements 16 and 17 are separated from the other radially-extending end face of rotary disc portion 13 by a similar air gap 23.

Each of the core elements 15 and 17 is provided with a plurality of circumferentially-spaced, radially-extending winding slots 24, while each of the core elements 14 and 16 is provided with a similar plurality of winding slots 25. Each set of slots is formed in that core element end face which is adjacent an associated air gap. The arrangement of these winding slots is best shown in quadrant 4 of FIGURE 2, these slots being preferably arranged so that each slot 24 is in alignment with an associated slot 25.

Inserted into the slots 24 and 25 of disc portion 10 is an alternating current winding 26, an identical winding 27 being disposed in the slots 24 and 25 associated with disc portion 11. One manner in which each winding may be disposed in its associated slots is shown in quadrant 4 of FIGURE 2. While this figure shows the appearance of the winding 27 when viewed in the direction of the arrows associated with line 5—5, the winding 26 would have an identical appearance when viewed in the opposite direction.

As may be seen, each of the windings 26 and 27 is wound in such a way that the conductor portion in each slot 25 is directly connected to a conductor portion disposed in a slot 24 which is angularly offset therefrom by a distance corresponding to one slot pitch. Although the winding is illustrated as being of the single phase type, it should be appreciated that it could be provided as a multi-phase winding in a manner well-known in the art.

Near the shaft 12, the stator disc portions 10 and 11 are provided with ventilating passages 28 and 29, respectively, while each side of rotary disc portion 13 is provided with a respective plurality of radially-extending cooling channels 30 and 31. The outer periphery of the machine is provided with a housing member 60 which connects disc portions 10 and 11 together and which is provided with a circumferentially-spaced plurality of air passages 32 (FIGURE 2).

When the machine is in operation, cooling air flows in through openings 28 and 29 and passes into cooling channels 30 and 31, where it is driven outwardly by the centrifugal forces produced by rotating disc portion 13, the heated air leaving the machine through openings 32.

Machine shaft 12 is mounted in bearings 44 which are supported on the disc portions 10 and 11 through the intermediary of nonmagnetic bushings 45. The outer peripheral surfaces of bushings 45 are provided with screw threads which mate with corresponding screw threads provided on the inner peripheral surfaces of stator disc portions 10 and 11 for permitting the position of shaft 12 and rotor disc portion 13 to be axially adjusted in order to assure that air gaps 22 and 23 will be perfectly identical, i.e., that disc portion 13 will be perfectly symmetrically disposed between disc portions 10 and 11.

The rotary disc portion 13 shown in FIGURE 1 and quadrant 5 of FIGURE 2 is made of two concentrically disposed cast pieces which together define a plurality of radially-extending spokes each composed of an inner spoke portion 34 and an outer spoke portion 38. The inner cast piece includes an annular hub 33 directly connected to shaft 12, an inner spoke assembly composed of a plurality of circumferentially-spaced, radially-extending spoke portions 34, and reinforcing connections 35 disposed between, and connecting together, the outer ends of spoke portions 34. An annular, nonmagnetic center ring 36 is disposed around the inner cast piece and is mounted on the outer ends of spoke portions 34 and reinforcing connections 35. The other cast piece is disposed around center ring 36 and is composed of an assembly of circumferentially-spaced, radially-extending outer spoke portions 38, reinforcing connections 37 disposed between, and connecting together, the inner ends of spoke portions 38, and an outer supporting ring 39 connecting together the outer ends of spoke portions 38. Reinforcing connections 37 and the inner ends of spoke portions 38 are connected to center ring 36 in such a manner that each spoke portion 38 is aligned with a respective spoke portion 34.

As is shown most clearly in quadrant 5 of FIGURE 2, a plurality of openings 40 are provided through rotary disc portion 13, these openings defining both regions of reduced magnetic conductivity to axially-flowing flux and ventilating passages for the flow of air through the machine.

As is shown in FIGURES 1 and quadrant 6 of FIGURE 2, the outer lateral surfaces of bodies 18 and 19 are provided with radially-extending ribs 41 which serve as heat dissipating cooling fins for aiding the removal of heat from the machine.

The housing member 60 is preferably made of a nonmagnetic material. Aluminium is suitable for this purpose particularly because its coefficient of thermal expansion is greater than that of the magnetic material, i.e., iron or steel, from which the disc portions 10, 11 and 12 are made. Because of this greater expansion coefficient, the axial expansion experienced by the housing member when the machine becomes heated will be sufficient to fully compensate for the axial expansion of the disc portions and thus to prevent any reduction in the axial length of the air gaps 22 and 23 as a result of these thermal expansions. In addition, the provision of a housing member made of a nonmagnetic material such as aluminium will effectively prevent the passage of stray flux between stator disc portions 10 and 11 via the machine housing.

The total axial length of the two air gaps can be adjusted simply by inserting suitable shims between housing member 60 and stator disc portions 10 and 11.

The construction of the rotor disc portion according to the present invention in the form of a plurality of spokes separated by air passages offers many substantial advantages. A principal one of these advantages resides in the fact that an extremely large magnetic conductivity variation is created between the high magnetic conductivity zones defined by the spokes, which are made of a magnetizable material, and the low magnetic conductivity zones defined by the openings between the spokes. In addition, by constituting the zones of low magnetic conductivity by air spaces a substantial rotor weight reduction is achieved. Furthermore, the openings defining these air spaces performed the added function of improving the ventilation of the machine. This form of construction according to the present invention further eliminates many of the electrical and mechanical difficulties encountered in the prior art.

Since the openings between the spokes of the rotor according to the present invention serve as slots, these rotors present extremely large effective slot depths which give the resulting machine a high moment.

The low rotor weight of machines according to the present invention gives these machines an improved starting ability when they are employed as motors. This starting ability may be further improved, if desired, by the provisions of a separate starting cage composed of bars which extend substantially radially.

The nonmagnetic separating layer between the spoke portions 34 of the inner spoke assembly and the spoke portions 38 of the outer assembly is preferably constituted by a closed ring 36 which serves to facilitate the assembly of the rotor and which acts as a reinforcing ring for improving the mechanical stability of the rotor. In addition, this ring will function as a damper ring.

Each of the spokes of the rotor assembly is preferably formed with substantially radially-extending sides, with the sides of each spoke portion 38 being aligned with the sides of its corresponding spoke portion 34. When this form of construction is employed, the cross-sectional area of each set of inner and outer spoke portions will vary continuously in proportion to the distance from the center of the machine so that the flux passing through the spokes will not be subjected to any losses due to abrupt cross-sectional variations at any point along a radius of the machine.

When each of the spokes is made of a solid piece, the surfaces thereof facing each air gap are preferably provided with radial slots, e.g., by means of the spark erosion process, which effectively eliminate losses due to currents induced in the spoke surfaces. The provision of spokes in the form of solid pieces permits the air gaps 22 and 23 to be made extremely small with the result that an increased flux variation factor ($d\varphi/dt$ where $d\varphi/dt$ max.= induced voltage) is obtained.

Machines according to the present invention are preferably constructed in such a manner that the total number of winding slots 24 or 25 in each of the core elements of the stator disc portions is equal to the total number of spokes 34, 38 and associated radial openings 40, i.e., equal to twice the total number of spokes 34, 38. Thus, when one of the A.C. winding conductor portions disposed in a slot 25 of an inner core element is opposite a spoke portion 34, the conductor portion of the next succeeding outer core element slot 24 to which it is directly connected will be disposed opposite one of the openings 40 of the outer rotor assembly. In addition, the A.C. winding conductor portion disposed in the next succeeding inner core element slot 25 will also be disposed opposite an opening 40. Since the flux produced by the excitation windings 20 and 21 passes in one axial direction through the outer spoke assembly of the rotor and in the opposite axial direction through the inner spoke assembly thereof, a maximum voltage of a first polarity will be induced in the first-mentioned conductor portion disposed in a slot 25 and a minimum voltage of the other polarity will be induced in that conductor portion in slot 24 to which it is directly connected. Thus, the two voltages will not completely cancel one another and a net voltage of the first polarity will be produced. A similar result could be obtained by directly connecting together the A.C. winding conductor portions disposed in aligned slots 24 and 25 and by offsetting the spoke portions 38 with respect to the spoke portions 34 in such a manner that each spoke portion 38 is disposed opposite an opening 40 of the inner spoke assembly and each spoke portion 34 is disposed opposite an opening 40 in the outer spoke assembly.

Figure 3:
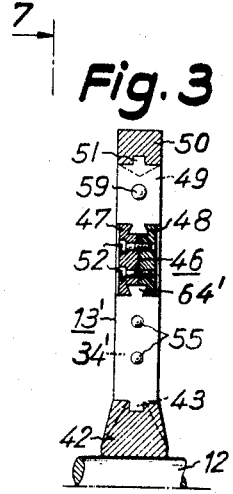
FIGURE 3 is a view similar to that of FIGURE 1 of a modified form of construction of one element of a machine according to the present invention.

Referring now to FIGURE 3 and quadrant 7 of FIGURE 2, there is shown another form of construction of the rotor disc portion according to the present invention. This disc portion 13' includes a hub 42 provided with a circumferentially-spaced plurality of recesses 43 for receiving the inner spoke portions 34' of an inner spoke assembly. The outer end of each of the spoke portions 34' is formed with a dovetail projection 64 which engages a correspondingly shaped slot on the inner periphrey of a nonmagnetic center ring 46.

Center ring 46 is composed of two parts 47 and 48 each having formed therein one-half of the slot for receiving the projections 64 and one-half of a corresponding slot for receiving a dovetail projection at the inner end of each outer spoke portion 49 of an outer spoke assembly. The outer end of each of the outer spoke portions 49 is held in an outer retaining ring 50 having a plurality of recesses 51 formed in its inner periphery for receiving these spoke portions.

The rotary disc portion 13' may be assembled in a rapid and simple manner by first inserting the inner ends of spoke portions 34' into the recesses 43 and the outer ends of outer spoke portions 49 into the recesses 51, and by then assembling the center ring parts 47 and 48 around the dovetail projections at the outer ends of spoke portions 34' and the inner ends of spoke portions 49. The only fastening means required are bolts 52 which hold the parts 47 and 48 together.

Each of the spoke portions 34' and 49 is made of a plurality of thin plates each of which is oriented to lie in a substantially radial plane containing the axis of shaft 12. This form of construction has the advantage of reducing flux losses by inhibiting the flow of current in an angular direction through the spoke portions. This is most clearly shown in quadrant 7 of FIGURE 3. As is also shown therein, each inner spoke portion 34' further includes two supporting plates 53 and 54 disposed at respective sides thereof and rivets 55 holding the plates of the inner spoke portion together. The recesses 43 in hub 42 are sufficiently large to permit the inner ends of the supporting plates 53 and 54 to fit therein.

The outer spoke portions 49 are constructed in an identical manner to the spoke portions 34', all of the spoke portions being preassembled before assembly of the rotary disc portion.

The lateral faces of the parts 47 and 48 have recesses, or slots 56 formed therein between adjacent spoke portions, these recesses extending in a substantially radial direction and serving to guide cooling air around the various parts of the rotary disc portion.

The thin metal plates of each of the outer spoke portions 49 are held together by two relatively thin supporting plates 57 and 58 disposed at respective sides of the outer spoke portion and held together by means of a rivet 59.

The hub 42 is also preferably provided with radially-extending grooves between the recesses 43 for aiding the ventilation of the machine. To further aid this ventilation, ventilator blades 65 may be secured to the ring 46 at locations spaced between the rotor spokes.

It will be understood that the above description of the present invention is susceptible to various modifications, changes, and adaptations, and the same are intended to be comprehended within the meaning and range of equivalents of the appended claims.

We claim:

1. In a rotary electric machine composed of at least three disc portions axially spaced from one another to define at least two air gaps each extending between a respective adjacent pair of said disc portions, at least one of said disc portions being stationary and constituting a machine stator and at least another one of said disc portions being rotatable and constituting a machine rotor, at least one annular homopolar excitation winding carried by one of said disc portions for producing a D.C. excitation field passing axially through at least said rotor, and at least one A.C. winding carried by one of said disc portions, the improvement wherein said rotor comprises: a plurality of radially-extending spokes of magnetizable material spaced apart about the axis of rotation of said machine, said spokes defining regions of high magnetic conductivity to flux flowing axially through said rotor and the spaces between said spokes defining regions of low magnetic conductivity to such flux; and nonmagnetic spacer means dividing each of said spokes into an inner portion and an outer portion along a circle aligned with said homopolar excitation winding; whereby flux produced by said homopolar winding flows in one axial direction through the region occupied by said inner spoke portions and in the opposite axial direction through the region occupied by said outer spoke portions.

2. An arrangement as defined in claim 1 wherein said nonmagnetic spacer means are constituted by a ring aligned with said homopolar winding and surrounding all of said inner spoke portions.

3. An arrangement as defined in claim 2 wherein said ring is provided with radially-extending recesses in its lateral end faces at locations disposed between said spokes.

4. An arrangement as defined in claim 2 wherein the ends of each of said spoke portions adjacent said ring are provided with dovetail projections and said ring is composed of two symmetrical parts joined together along the median plane of said rotor, each of said parts being provided with recesses which mate with one-half of each of said dovetail projections, whereby said spoke portions can be assembled to said ring by bringing said ring parts together around said dovetail projections and fastening said ring parts together.

5. An arrangement as defined in claim 2 further comprising a plurality of ventilator blades mounted on said ring, each of said blades being disposed substantially midway between a respective adjacent pair of said spokes.

6. An arrangement as defined in claim 1 wherein the sides of each of said spokes extend substantially radially.

7. An arrangement as defined in claim 1 wherein each of said spoke portions is made of a solid piece and has radial slots formed by the spark erosion process in the end faces thereof which are adjacent said air gaps.

8. An arrangement as defined in claim 1 wherein each of said spoke portions is composed of a plurality of stacked plates each disposed substantially in a radial plane containing the axis of rotation of said machine.

9. An arrangement as defined in claim 1 wherein said rotor further comprises a hub provided with a plurality of recesses into each of which is inserted the radially-innermost end of a respective one of said inner spoke portions.

10. An arrangement as defined in claim 9 wherein said hub is further provided with a plurality of radially-extending ventilating channels each disposed between an adjacent pair of said recesses.

References Cited

UNITED STATES PATENTS

| | | | |
|---|---|---|---|
| 2,302,013 | 7/1942 | Farkas | 310—268 |
| 2,428,781 | 10/1947 | Bowlus | 310—268 |
| 3,320,450 | 5/1967 | Bosco | 310—268 |

WARREN E. RAY, *Primary Examiner.*

R. SKUDY, *Assistant Examiner.*

U.S. Cl. X.R.

310—178, 180, 192, 254, 268